United States Patent [19]

Asrar

[11] Patent Number: 4,965,330

[45] Date of Patent: Oct. 23, 1990

[54] NORBORNENE DICARBOXIMIDE POLYMER

[75] Inventor: Jawed Asrar, Wilbraham, Mass.

[73] Assignee: Monsanto Company, St. Louis, Mo.

[21] Appl. No.: 256,212

[22] Filed: Oct. 7, 1988

Related U.S. Application Data

[63] Continuation-in-part of Ser. No. 67,562, Jun. 26, 1987, abandoned.

[51] Int. Cl.$^5$ ............................................. C08F 26/06
[52] U.S. Cl. ................................... 526/259; 525/279; 526/90; 526/159; 526/209; 526/262
[58] Field of Search ................. 526/259, 262; 528/322

[56] References Cited

U.S. PATENT DOCUMENTS 3,494,897 2/1970 Reding et al. ....................... 260/78.5
3,959,234 5/1976 Kurosawa et al. ................... 526/259

FOREIGN PATENT DOCUMENTS 0263425 9/1987 European Pat. Off. .

*Primary Examiner*—Harold D. Anderson
*Attorney, Agent, or Firm*—Thomas E. Kelley; Richard H. Shear

[57] ABSTRACT

Polymerization of norbornene dicarboximide yields polymers of high Tg, e.g. greater than 170° C. Preferred polymers of N-phenyl norbornene dicarboximide exhibit Tg greater than 210°C.

3 Claims, 1 Drawing Sheet

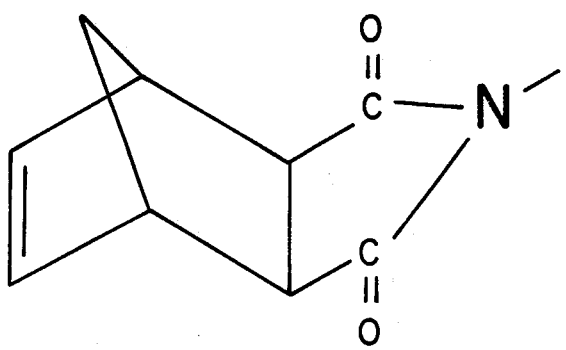
EXO STEREOISOMER
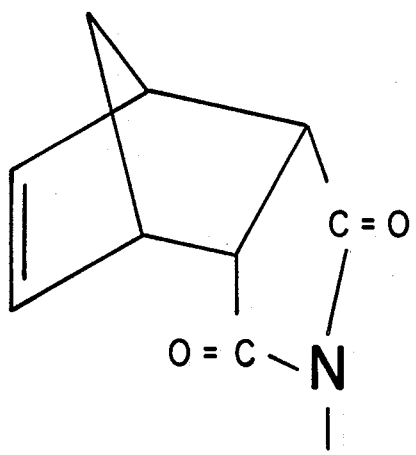
ENDO STEREOISOMER

NORBORNENE DICARBOXIMIDE POLYMER

This a continuation-in-part of application Ser. No. 07/067,562, filed June 26, 1986, now abandoned.

BACKGROUND

Disclosed herein are inventions relating to high temperature-resistant thermoplastic polymers of norbornene dicarboximides and to methods of making and using such polymers. More particular aspects include inventions relating to polymers of N-phenyl norbornene dicarboximide.

High temperature resistance, e.g. as measured by heat distortion temperature and glass transition temperature ($T_g$), is provided in several existing polymer systems, e.g. the polyether imides and the polyamide-imides. In addition to high strength and high modulus, a desirable characteristic of such polymer systems includes processability like more conventional lower temperature thermoplastic polymers.

McKeon et al. in U.S. Pat. No. 3,330,815 disclose the vinyl-type addition polymerization of a variety of norbornene derivatives, including carboximides, to provide polymers free of unsaturation in the chain. Such polymerization is carried out with noble metal catalyst, i.e. palladium compounds.

Reding et al. in U.S. Pat. No. 3,494,897 disclose the vinyl-type addition polymerization including copolymerization with alkenes, of a variety of norbornene derivatives to provide polymers of saturated chains. Such polymerization of copolymers of norbornene derivatives including dicarboximides (see for instance Examples 24 and 25) is carried out in the presence of a free-radical catalyst, e.g. a peroxide.

See also French Brevet d'invention No. 1,594,934 which discloses polymerization of norbornene dicarboximides with noble metal catalyst, e.g. ruthenium compounds. Analyses reported by Michelotti et al. in *Journal of Polymer Science* 3 (1965) pp 895–905 suggest that ruthenium catalysts may effect polymerization to some extent through a bicyclic double bond without ring opening (see Michelotti et al. at p. 902).

Such noble-metal-catalyzed imide polymers as reported in Brevet No. 1,594,934 have somewhat low glass transition temperatures (Tg). See, for instance, Example 2 which reports the preparation of a polymer of N-methyl norbornene dicarboximide having a Tg of 185° C. See also Example 14 which reports the preparation of a polymer of N-phenyl norbornene dicarboximide having a Tg of 162° C. In this regard see the Comparative Example, herein, which indicates that the substantially no polymerization results from the experimental procedure reported in Brevet No. 1,594,934, that the recovered material is substantially monomer, and that the reported Tg corresponds to a melting point.

Kurosawa et al., in U.S. Pat. No. 3,959,234 disclose the ring-opening polymerization of norbornene dicarboximides with a catalyst system comprising organic aluminum compounds and tungsten and/or molybdenum compounds. However, multiple polymerization mechanisms may have been involved perhaps due to contaminated catalyst since the tungsten-catalyzed polymers of the working examples are reported as having Tg's similar to the noble metal-catalyzed polymers reported in Brevet No. 1,594,934. In this regard in the U.S. Patent poly (N-methyl norbornene dicarboximide) is reported to have a Tg of 189° C.; in the Brevet a Tg of 185° C. is reported. Similarly, in the U.S. Patent poly (N-phenyl norbornene dicarboximide) is reported to have a Tg of 166° C.; in the Brevet the Tg is 162° C.

Other attempts at the metathesis ringopening polymerization of norbornene dicarboximides have met with apparently limited success. For instance, see Matsumoto et al. at *ACS Symposium Series* 59 (1977), page 303, who report poor polymer yield (i.e. about 8 percent) in attempts to polymerize monomers of norbornene dicarboximide and N-propyl norbornene dicarboximide. The preparation of monomers by Matsumoto et al. suggests that endo stereoisomers of the dicarboximides were used. Related work by Matsumoto is found in U.S. Pat. No. 4,039,491, e.g. in Example 20, where low molecular weight polymers of N-propyl norbornene dicarboximide were apparently obtained especially since polymerization was carried out in the presence of 1-hexene, a molecular weight limiting material.

SUMMARY OF THE INVENTION

By this invention I have provided high temperature-resistant polymers of N-phenyl norbornene dicarboximides of sufficiently high molecular weight as to exhibit desirable properties of high strength and modulus and processability whether provided as a homopolymer, a copolymer, a graft copolymer or a blend. The polymers comprising units of norbornene dicarboximide have surprisingly high Tg, e.g. greater than about 170°, or higher say at least about 180° or 190°. In many cases the polymers of this invention have Tg greater than 200°.

Preferred aspects of my invention provide exceptionally high temperature resistant polymers of N-phenyl norbornene dicarboximides, e.g. homopolymers and copolymers of the N-phenyl imide exhibiting a Tg greater than about 210°.

BRIEF DESCRIPTION OF THE DRAWINGS

FIG. 1 structurally illustrates the stereoisomeric forms of norbornene dicarboximide monomers.

DETAILED DESCRIPTION OF THE INVENTION

Throughout this specification, percentages of compositions are by weight and temperatures in degree Celsius, unless indicated otherwise. "Tg" as used herein means the glass transition temperature of a polymer which is determined at the mid-point of the inflection in the glass transition region during differential scanning calorimetry at a heating rate of 20° C./min. The Tg of the polymer is determined by placing a sample of the polymer in an aluminum calorimeter pan in a differential scanning calorimeter (e.g. a Perkin-Elmer DSC 4), preheating to a temperature above the glass transition temperature and rapidly cooling with liquid nitrogen to less than 30° C.; the Tg is then determined by heating at 20° C./min.

As used herein the term "inherent viscosity" (IV) is an indication of molecular weight of a polymer defined as $(\ln T_s/T_o)/C$, where $T_s$ is the efflux time from an Ostwald viscometer of a unit volume of a sample of polymer in a solvent at concentration "C" expressed in units of grams per deciliter (g/dl), and $T_o$ is the efflux time of a similar unit volume of the solvent. For IV reported herein the Ostwald viscometer was selected so that the efflux time exceeds 100 seconds. Measurements were typically taken on 25 ml samples equilibrated to 25°. Polymer solutions were conveniently prepared at a concentration of 0.5 g/dl. Any suitable solvent can be used. For instance, dimethyl sulfoxide has been found suitable for polymers of endo stereoisomers of N-phenyl norbornene dicarboximide; and symmetrical tetrachloroethane has been found to be suitable for use with polymers of exo stereoisomers.

Number average molecular weights (Mn) reported herein were determined by size exclusion chromatography (SEC) with samples of polymer dissolved in chloroform. Filtered (0.45 micrometer) samples (100–200 ml) were passed at a flow rate of 1 ml/min. in four ASI Vetragel SEC columns ($10^6$, $10^5$, $10^4$, $10^3$ Angstroms packing). Fractions were compared against polystyrene standards in a Waters Model 401 differential refractive index detector. Molecular weight determinations were made by a Perkins Elmer Model 7500 GPC 6 data acquisition systems.

I have discovered that polymers of N-phenyl norbornene dicarboximides can be realized with sufficiently high molecular weights to allow advantageous physical and mechanical properties as well as thermoplastic processability by carrying out the metathesis ring opening polymerization of N-phenyl norbornene dicarboximides of specified stereoisomeric form.

In the following disclosure of my inventions reference is made to the "endo" and "exo" stereoisomeric forms of the norbornene dicarboximide monomers. As used herein, the term "endo" refers to the stereoisomeric form of the monomer such as norbornene dicarboximide or norbornene dicarboxylic anhydride in which the carbonyl groups are cis with respect to the double bond which is opened during metathesis polymers. As illustrated in FIG. 1, in the endo isomer the carbonyl groups and double bond are both on the same side of the surface of the saturated five-membered ring of the monomer. As used herein, the term "exo" refers to the stereoisomeric form of such monomers in which the carbonyl groups are trans with respect to the double bond. Again, as illustrated in FIG. 1, the carbonyl groups and double bond are on opposite sides of the surface of the saturated five-membered ring of the monomer.

I have discovered that the endo stereoisomer of an N-phenyl norbornene dicarboximide, as apparently used in prior art attempts, is difficult to polymerize and forms, at best, low molecular weight polymers of limited utility. I have further discovered that the use of exo stereoisomers of norbornene dicarboximides, e.g. at least about 15 percent exo stereoisomer, allows polymerization to advantageously high molecular weight polymers which exhibit exceptionally useful properties.

Polymers of this invention can be illustrated as comprising monomer units of the structural formula

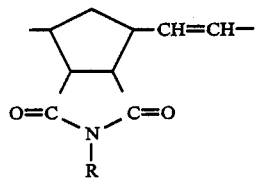

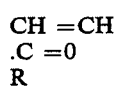

where R is phenyl or substituted phenyl such as chlorphenyl, hydroxyphenyl, tolyl, cyanophenyl and the like. The polymers of this invention can comprise homopolymers, or substantially homopolymers, of such norbornene dicarboximides. Alternatively, the polymers of this invention can comprise copolymers of such norbornene dicarboximides, including copolymers with other norbornene derivative monomers such as 5-norbornene, norbornene nitrile, norbornene dicarboxylic anhydride and the like, or with other copolymerizable monomers such as cycloolefins, e.g. cyclopentene, cycloheptene, cyclooctene, tetracyclododecene, dicyclopentadiene, etc. Similarly, the polymers of this invention can comprise block copolymers or graft copolymers of such norbornene dicarboximides, e.g. graft copolymers of norbornene dicarboximide on polymeric rubber substrates such as polybutadiene or nitrile rubber.

The polymers of this invention are provided as thermoplastic polymers of sufficiently high molecular weight, e.g. having a number average molecular weight ($M_n$) of at least 6,000, preferably at least 8,000. More preferred polymers exhibiting exceptionally high $T_g$'s above 220° C. can have $M_n$ of 20,000 or higher. In Tg many cases preferred polymers of this invention will exhibit an IV of at least 0.5 or higher, e.g. 0.7 or 1.

The polymers of this invention are obtained by metathesis ring opening polymerization of N-phenyl norbornene dicarboximide monomers of at least about 15 percent exo stereoisomeric form as illustrated in FIG. 1, where R is as defined above. In many cases, e.g. where it is desirable to provide polymers of high molecular weight, it is advantageous &o provide the exo isomeric monomers at higher concentrations, e.g. 25 percent or even higher, say 50 percent. In some cases it is preferred, although not necessary, for the norbornene dicarboximide monomers to be present in the exo stereoisomer form at even higher concentrations, e.g. at least 70 percent or even higher, say 80–90 percent. It is also useful to employ the dicarboximide monomers at substantially 100 percent levels of the exo stereoisomeric form.

The norbornene dicarboximide monomers are advantageously derived from monomers of norbornene dicarboxylic acids. Such monomers are readily prepared through Diels-Alder reaction of cyclopentadiene and maleic anhydride by methods that are well known, e.g. as disclosed in U.S. Pat. No. 4,022,954, incorporated herein by reference. In this regard, I have discovered that the Diels-Alder reaction product of cyclopentadiene and maleic anhydride is substantially the endo stereoisomer. This endo stereoisomer can be converted to a predominantly exo stereoisomer by heating and recrystallization, e.g. by well-known procedures such as disclosed by Castner et al. in *Journal of Molecular Catalysis* 15, (1982) 47–59. For instance, in the case of norbornene dicarboxylic anhydride heating at about 198° for about two hours provides a molten equilibrium mixture of about 45 percent endo stereoisomer and about 55 percent exo stereoisomer. Predominantly exo stereoisomer of NDA can be recovered by selective crystallization from a solvent such as toluene. Through multiple recrystallizations substantially high levels of the exo stereoisomer can be recovered, e.g. at least about 85 percent or higher.

The dicarboximides can be prepared by reacting a primary amine, e.g. aniline, with the norbornene dicarboxylic anhydride providing an amic acid which can be readily imidized.

The norbornene dicarboximide monomers present at about 15 percent or higher in the exo stereo isomer form are readily polymerized in solutions containing ring opening catalysts. A preferred catalyst comprises the reaction product of tungsten hexachloride and an acetal, e.g. 1,1-diethoxy ethane. Preferably the polymerization reaction solution will also contain as an activator an aluminum alkyl such as diethyl aluminum chloride, triisobutyl aluminum or the like. Higher yields of polymers of higher IV have been achieved with solutions of triisobutylaluminum as the activator. The polymerization reaction solutions should be kept dry and free of contaminants, e.g. oxygen, that may undesirably react with the catalyst and/or activator solutions.

The polymers of this invention recovered from such polymerization solutions can be advantageously provided in a desired product form by conventional thermoplastic processing, e.g. by injection molding.

The following disclosure is provided to illustrate specific embodiments and aspect of the polymers of this invention but is not intended to imply any limitation of the scope of this invention.

EXAMPLE 1

This example illustrates the preparation of predominantly exo norbornene dicarboxylic anhydride (NDA).

3,500 g of endo NDA was heated at 198° for two hours. 3.5 liters of toluene was added to molten NDA to provide a solution of NDA in toluene which was allowed to cool under a nitrogen atmosphere resulting in the precipitation of about 2,200 g of NDA. The NDA crystals were redissolved in three liters of toluene. The resulting solution was cooled under nitrogen producing about 1,200 g of NDA which comprised about 85 percent of the exo stereo isomer.

EXAMPLE 2

This example serves to illustrate the preparation of the substantially exo N-phenyl norbornene dicarboximide (NDI).

1.4 mole (about 230 g) of exo NDA prepared essentially as indicated in Example 1 was dissolved in 1.4 liters of toluene. 1.4 moles (about 130 g) of aniline was added dropwise to the stirred solution of NDA resulting in a slurry of the amic acid reaction product. The stirred slurry of amic acid was maintained 100° for about one hour, then cooled to room temperature and filtered to recover the amic acid. A mixture of about 290 g of the amic acid, 43.6 g sodium acetate and 850 ml acetic anhydride was heated at reflux for about 1 ½ hours, then cooled and filtered to recover substantially the exo isomer of NDI (melting point: about 200°-202°).

EXAMPLE 3

This example illustrates the preparation of the substantially endo isomeric form of NDI (endo NDI) and its isomerization to exo NDI.

The procedure of Example 2 was essentially repeated except that the substantially endo stereo isomeric form of NDA was utilized to produce the substantially endo NDI (melting point: about 145°).

Isomerization was effected by heating endo NDI to about 260° C. for about 30 minutes, then cooling to room temperature. By adding acetone, residual endo NDI was dissolved and removed by filtration, leaving crystals of predominantly exo NDI.

EXAMPLE 4

This example serves to illustrate the polymerization of both stereo isomeric forms of NDI and the differences in the polymer based on isomeric forms.

Into separate reaction vials were placed 3.45 g of exo NDI in 21 ml of dichloroethane and 3.45 g of endo NDI in 11 ml of dichloroethane. 0.15 ml of a catalyst solution comprising 0.5M tungsten hexachloride-acetal (mole ratio 1:2) in toluene and 0.22 ml of activator solution comprising 2.05M diethyl aluminum chloride in heptane was injected into each vial being maintained at 70°-75°. After about 18 hours about 0.5 ml methanol was injected into each vial to stop the polymerization reaction. The viscous reaction product of poly(exo NDI) was diluted with 25 ml methylene chloride, precipitated in methanol and dried in a vacuum oven to yield 3 g of poly(exo NDI) exhibiting an inherent viscosity of about 1.03 and a $T_g$ of 227° C. The high inherent viscosity indicates the production of a high molecular weight polymer. The reaction product of endo NDI was precipitated in methanol to yield about 0.5 g of a powdery material exhibiting an inherent viscosity of about 0.08 and a $T_g$ of about 226° C. The low inherent viscosity indicates the production of a low molecular weight polymer.

EXAMPLE 5

This example serves to illustrate the polymerization of mixtures of endo and exo NDI.

Reaction vials were filled with mixtures of the endo and exo NDI dissolved in 40 ml of dichloroethane in the proportions reported in Table 1. Each vial was injected with 0.26 ml of the catalyst solution and 0.38 ml of the activator solution used in the Example 4. The vials were held at about 60° for about 18 hours. About 1 ml of methanol was added to each vial to stop the polymerization. The polymer products were precipitated in methanol, filtered, and dried in a 50° oven. (Both exo and endo NDI monomers are substantially soluble in methanol.) The yield of each polymerization reaction is reported in Table 1 together with the number average molecular weight (Mn) of the polymer. The results reported in Table 1 indicate that when high polymer yields and high molecular weight polymers of norbornene dicarboximides are desired it is advantageous to provide the norbornene dicarboximide monomer in the exo stereo isomeric form at levels of greater than about 16 percent.

TABLE 1

Polymerization of Mixtures of Exo and Endo NDI

| Endo Isomer (wt. percent) | | Polymer | |
|---|---|---|---|
| Monomer | Polymer | Yield* | $M_n$ |
| 17 | 11 | 87% | 30,100 |
| 33 | 19 | 83% | 24,500 |
| 50 | 29 | 63% | 20,000 |
| 67 | 28 | 53% | 17,000 |
| 83 | 25 | 16% | 6,500 |

*Yield based on weight of recovered polymer to combined weight of isomers.

EXAMPLE 6

This Example serves to illustrate the processability and mechanical properties of polymers of the exo stereo isomeric form of NDI.

Poly(exo NDI) was prepared essentially as in Example 4 except that, prior to precipitating the polymer, antioxidants were added to facilitate processing. A solution of 3.4 g. of hindered phenol (Ethanox 330 from Ethyl Corp.) and 1.7 g. of tris nonyl phenyl phosphate (Polygard from Uniroyal, Inc.) in 100 ml. of ethanol and 200 ml. of methylene chloride was added to the polymer solution to provide 1% Ethanox and 0.5% Polygard on a solids weight basis. Solvent was evaporated from the solution providing about 330 g. of poly (exo NDI), about 97% yield. The polymer was extruded at 280° through a twin screw extruder and molded at about 290° into specimen bars that were used for mechanical property analysis. The results of this mechanical property analysis are reported in Table 2. The Notched Izod Impact resistance was determined on a 3 mm (⅛ inch) thick bar.

TABLE 2

Mechanical Property Analysis of Poly(exo-NDI)

| | | |
|---|---|---|
| Tensile Strength | 610 Kg/cm$^2$ | (8700 psi) |
| Tensile Modulus | 28,400 Kg/cm$^2$ | (404,000 psi) |
| Elongation | 1.4% | (1.4%) |
| Flexural Strength | 900 Kg/cm$^2$ | (12,800 psi) |
| Flexural Modulus | 30,000 Kg/cm$^2$ | (426,000 psi) |
| Notched Izod Impact | 19 J/m | (0.35 ft-lb/in) |

Table 2
Mechanical Property Analysis of Poly(exo-NDI) Tensile Strength 610 Kg/cm2 (8700 psi) Tensile Modulus 28,400 Kg/cm2 (404,000 psi) Elongation 1.4(1.4) Flexural Strength 900 Kg/cm2 (12,800 psi) Flexural Modulus-30,000 Kg/cm2 (426,000 psi) Notched Izod Impact 19 J/m (0.35 ft-lb/in)

EXAMPLE 7

This Example serves to illustrate the preparation of a graft polymer of NDI onto a rubber substrate.

1.2 grams of a block copolymer of styrene and butadiene (obtained from Phillips Petroleum Co. as Kraton ® 1102) was dissolved in 42 ml of dichloroethane. To that solution was added 12 g of exo NDI monomer, 0.5 ml of the catalyst solution and 0.76 ml of the activator solution as used in Example 4. The resulting mixture was stirred at 60° for 18 hours, then cooled. 12.5 g of graft copolymer, precipitated in methanol, exhibited a $T_g$ of 214.5° and had a Mn of 30,600.

EXAMPLE 8

This Example serves to illustrate the preparation of a water soluble copolymer of exo NDI and exo NDA.

Equimolar parts of exo NDI (2.4 g) and exo NDA (1.64 g) were dissolved in 20 ml of dichlorethane and placed in a reaction vial with 0.2 ml of the catalyst solution and 0.31 ml of the activator solution as used in Example 4. The reaction mixture was maintained at 70° C. for about 18 hours. Then about 2 ml of methanol was injected into the vial to stop the polymerization. The recovered reaction product was cast into a film from a solution in dimethyl sulfoxide. The film was soluble in 0.1 N aqueous sodium hydroxide solution.

EXAMPLE 9

This Example serves to illustrate the preparation of a copolymer of exo NDI and norbornene nitrile (NN).

Exo NDI and NN were dissolved in dichloroethane in the molar ratios reported in Table 3. Vials of each mixture were injected with 0.13 ml of the catalyst solution and 0.2 ml of the activator solution utilized in Example 4. The reaction mixtures were held at about 65° for about 18 hours. The resulting polymers were precipitated in methanol, filtered and dried at about 60°. Mn and Tg of the polymers are reported in Table 3 for each of the resulting copolymers.

TABLE 3

Copolymers of NDI and NN

| | m moles | | | $T_g$ |
|---|---|---|---|---|
| | NDI | NN | $M_n$ | °C. |
| A | 12.5 | 0 | 27,000 | 221 |
| B | 12.5 | 8.4 | 28,000 | 194 |
| C | 12.5 | 16.8 | 36,000 | 185 |
| D | 12.5 | 25.2 | 45,000 | 174 |
| E | 0 | 25.2 | | ~130 |

Table 3
Copolymers of NDI and NN
m moles
NDI NN T<
C A 12.5 0 27,000 221 B 12.5 8.4 28,000 194 C 12.5 16.8 36,000 185 D 12.5 25.2 45,000 174 E 0 25.2 130

EXAMPLE 10

This example serves to illustrate the preparation of a polymer of exo N-chlorophenyl norbornene dicarboximide (NDI-Cl).

A solution of p-chloroaniline.(68.8 g in 150 ml of toluene) was added dropwise to a solution of exo NDA (82 g in 150 ml of toluene) maintained at 60° C. The reaction mixture was held at 60° C. for 1 hour, refluxed for 1 hour, cooled to room temperature and filtered to recover amic acid. The amic acid was mixed with 10 g of sodium acetate in 150 ml of acetic anhydride, refluxed for 90 minutes, cooled, filtered, washed with water and dried in a vacuum oven to recover 89 g of exo NDI-Cl.

3 g of exo NDI-Cl dispersed in 9 ml of 1,2-dichloroethane was polymerized by adding 0.13 ml of the catalyst solution and 0.2 ml of the activator solution described in Example 4. The reaction mixture was held at 65° C. for 2 hours. The viscous reaction product was diluted with 10 ml of 1,2-dichloroethane, precipitated in methanol, filtered and dried in a vacuum oven, yielding 2.5 g of polymer exhibiting a $T_g$ of 230° C. and a $M_n$ of about 22,000.

EXAMPLE 11

This example serves to illustrate the preparation of a copolymer of exo NDI and exo N-cyanophenyl norbornene dicarboximide (NDI-CN).

Exo NDI-CN (melting point: 228° C.) was prepared from exo NDA and cyanoaniline essentially in the manner of the preparation of NDI-CL in Example 10. 1.2 g of exo NDI, 1.8 g of exo NDI-CN, 9 g of 1,2-dichloroethane, 0.13 ml of catalyst solution and 2 ml of activator solution were combined and reacted at 65° C. for about 16 hours. The reaction product was dissolved in DMAC, precipitated in methanol, filtered and dried in a vacuum oven at 85° C., yielding a polymer with a $T_g$ of 246° C.

EXAMPLE 12

This example serves to illustrate the effect of molecular weight on the $T_g$ of the polymers of exo NDI.

Exo NDI was polymerized essentially in the manner of Example 4 using 3 g of exo NDI in 9 ml of 1,2-dichloroethane, 0.13 ml of catalyst solution, 2 ml of activator solution and hexene-1 as a chain terminator in the amount indicated in Table 4.

$M_n$ and $T_g$ reported in Table 4 illustrate the effect of molecular weight on $T_g$.

TABLE 4

| hexene-1 (ml) | $M_n$ | $T_g$ |
|---|---|---|
| 0 | 34,000 | 215 |
| 0.04 | 8,500 | 198 |
| 0.08 | 6,450 | 185 |
| 0.16 | 5,700 | 177 |
| 0.24 | 4,600 | 164 |
| 0.48 | 3,200 | 142 |
| 0.64 | 2,800 | 133 |

COMPARATIVE EXAMPLE A

This comparative example serves to illustrate prior art attempts to polymerize NDI with noble metal catalyst as suggested in French Brevet d'invention No. 1,594,934, e.g. Example 14.

10 g. exo-NDI was mixed with 3 mg. of ruthenium trichloride-trihydrate in 2 ml. of butanol. This mixture was held at 110° C. for 5 hours with no visible change in the initial mixture. The mixture was added to 700 ml. of ethanol. 0.1 g. (yield: 1%) of insoluble material, recovered from the ethanol, was analyzed by differential scanning calorimetry, which indicated a melting point at about 195° C. The melting point of endo NDI has been determined to be about 145° C.; the melting point of exo NDI, about 200° C. It can be concluded that the insoluble material (e.g. about 1% of the initial exo NDI) is predominantly a mixture of endo and exo NDI. The 0.1 g. of insoluble material was further washed in ethanol providing several milligrams of material exhibiting a Tg of about 242° C.

The above procedure was repeated except that the 10g. of exo NDI was replaced with 10 g. of an equilibrium mixture of endo and exo NDI (45:55). The recovered insoluble material exhibited a melting point of about 185° C.

COMPARATIVE EXAMPLE B

This example serves to illustrate a low heat prior art polymer of N-benzyl norbornene dicarboxide which is reprted in French Brevet d'invention No. 1,594,934 (Example 15) as having a $T_g$ of 152° C.

Essentially in the manner of Example 10, 3 g of exo N-benzyl norbornene dicarboximide, 6 ml of 1,2-dichloroethane, 0.13 ml of catalyst solution, and 0.2 ml of activator solution were reacted to produce a polymer having a $M_n$ of about 10,000 and a $T_g$ of 120° C.

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:

1. A polymer comprising norbornene dicarboximide units essentially of the formula

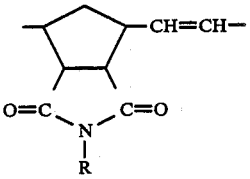

where R is phenyl or substituted phenyl; wherein said polymer has an number average molecular weight greater than about 6,000 and a $T_g$ greater than about 200° C.

2. Poly (N-phenyl norbornene dicarboximide) having a Tg greater than about 200° C.

3. A copolymer of N-phenyl norbornene dicarboximide having a number average molecular weight greater than about 8,000 and a $T_g$ of at least 170° C.

* * * * *

UNITED STATES PATENT AND TRADEMARK OFFICE
CERTIFICATE OF CORRECTION

PATENT NO. : 4,965,330

DATED : Oct. 23, 1990

INVENTOR(S) : Jawed Asrar

It is certified that error appears in the above-identified patent and that said Letters Patent is hereby corrected as shown below:

In column 1, line 5, "1986" should read --1987--.

In column 3, lines 62-64, "CH=CH .C=O R" should be deleted.

In column 4, line 20, "Tg" should be deleted; line 30, "&o" should read --to--.

In column 6, lines 62-68, "Table 1  Polymerization of Mixtures of Exo and Endo NDI  Endo Isomer  (wt. percent) Polymer Monomer Polymer Yield* 17 11 8733 19 8324,500 50 29 6320,000 67 28 5317,000 83 25 166,500 *Yield based on weight of recovered polymer to combined weight of isomers" should be deleted.

In column 7, lines 34-40, "Table 2 Mechanical Property Analysis of Poly(exo-NDI) Tensile Strength 610 Kg/cm2 (8700 psi) Tensile Modulus 28,400 Kg/cm2 (404,000 psi) Elongation 1.4(1.4) Flexural Strength 900 Kg/cm2 (12,800 psi) Flexural Modulus 30,000 Kg/cm2 (426,000 psi) Notched Izod Impact 19 J/m (0.35 ft-lb/in)" should be deleted.

In column 8, lines 25-30, "Table 3 Copolymers of NDI and NN m moles NDI NN T< C A 12.5 0 27,000 221 B 12.5 8.4 28,000 194 C 12.5 16.8 36,000 185 D 12.5 25.2 45,000 174 E 0 25.2 130" should be deleted.

UNITED STATES PATENT AND TRADEMARK OFFICE
CERTIFICATE OF CORRECTION

PATENT NO. : 4,965,330

DATED : Oct. 23, 1990

INVENTOR(S) : Jawed Asrar

It is certified that error appears in the above-identified patent and that said Letters Patent is hereby corrected as shown below:

In column 9, lines 25-27, "Table 4 hexene-1(ml) Tg 0 34,000 215 0.04 8,500 198 0.08 6,450 185 0.16 5,700 177 0.24 4,600 164 0.48 3,200 142 0.64 2,800 133" should be deleted.

In column 10, lines 38-42, "CH=CH C=O O=C N R" should be deleted.

Signed and Sealed this

Seventh Day of April, 1992

Attest:

HARRY F. MANBECK, JR.

*Attesting Officer*  *Commissioner of Patents and Trademarks*